(12) United States Patent
Heinrich et al.

(10) Patent No.: US 10,342,173 B2
(45) Date of Patent: *Jul. 9, 2019

(54) AUTOMATED FARMING SYSTEMS

(71) Applicant: Deere & Company, Moline, IL (US)

(72) Inventors: Nathan C. Heinrich, Des Moines, IA (US); Richard J. Connell, Slater, IA (US); Travis Newton, Urbandale, IA (US); Jeremy B. Thompson, Waukee, IA (US); Ray M. Scheufler, Grimes, IA (US); Jesse D. Haecker, Urbandale, IA (US)

(73) Assignee: Deere & Company, Moline, IL (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/432,221

(22) Filed: Feb. 14, 2017

(65) Prior Publication Data

US 2017/0325398 A1      Nov. 16, 2017

Related U.S. Application Data

(60) Provisional application No. 62/335,846, filed on May 13, 2016.

(51) Int. Cl.
*A01C 7/06* (2006.01)
*A01C 21/00* (2006.01)
(Continued)

(52) U.S. Cl.
CPC ............ *A01C 7/06* (2013.01); *A01B 39/18* (2013.01); *A01B 51/02* (2013.01); *A01C 14/00* (2013.01);
(Continued)

(58) Field of Classification Search
CPC .......... A01C 7/06; A01C 7/00; A01C 21/007; A01C 21/00; A01C 14/00; A01C 21/005;
(Continued)

(56) References Cited

U.S. PATENT DOCUMENTS

| | | |
|---|---|---|
| 4,253,586 A | 3/1981 | Jalas |
| 4,340,183 A | 7/1982 | Kegel et al. |

(Continued)

FOREIGN PATENT DOCUMENTS

| | | |
|---|---|---|
| FR | 905928 A | 12/1945 |
| WO | WO-2008/136804 A1 | 11/2008 |

(Continued)

OTHER PUBLICATIONS

Cutforth, H. W. et al. "Yield and Water Use of Paired-Row Versus Equidistant-Row Seeded Spring Wheat in a Semiarid Environment" Can. J. Plant Sci. 72: pp. 459-463 (Apr. 1992).

(Continued)

*Primary Examiner* — Christopher J. Novosad
(74) *Attorney, Agent, or Firm* — Harness, Dickey & Pierce P.L.C.

(57) ABSTRACT

An automated farming system includes a frame. The frame includes a fixed base, a beam, and a support. A farming implement support extends from the beam and moves up and down in relation to the beam. The farming implement support moves along a length of the beam. The movable support includes a propulsion system and is configured to rotate around the fixed base. Movement of the farming implement support and the movable support allows for high density planting of crops in hexagonal patterns and/or a continuous spiral pattern.

17 Claims, 13 Drawing Sheets

(51) Int. Cl.
  *A01C 14/00* (2006.01)
  *A01B 39/18* (2006.01)
  *A01B 51/02* (2006.01)
  *A01G 25/09* (2006.01)
  *A01G 25/16* (2006.01)
(52) U.S. Cl.
  CPC .......... *A01C 21/005* (2013.01); *A01C 21/007* (2013.01); *A01G 25/092* (2013.01); *A01G 25/16* (2013.01)
(58) Field of Classification Search
  CPC .......... A01B 39/18; A01B 39/12; A01B 39/00; A01B 51/02; A01B 51/00; A01G 25/092; A01G 25/09; A01G 25/00; A01G 25/16
  See application file for complete search history.

(56) References Cited

U.S. PATENT DOCUMENTS

| | | | |
|---|---|---|---|
| 4,660,775 A | 4/1987 | Ostrom et al. | |
| 5,628,262 A | 5/1997 | Nelson | |
| 5,927,603 A | 7/1999 | McNabb | |
| 5,991,694 A | 11/1999 | Gudat et al. | |
| 6,173,664 B1 | 1/2001 | Heimbuch | |
| 6,386,128 B1 | 5/2002 | Svoboda et al. | |
| 6,516,271 B2 | 2/2003 | Upadhyaya et al. | |
| 6,553,299 B1 | 4/2003 | Keller et al. | |
| 8,417,534 B2 | 4/2013 | Belzer et al. | |
| 8,622,008 B2 | 1/2014 | Henning et al. | |
| 2007/0188605 A1 | 8/2007 | Anderson et al. | |
| 2007/0267524 A1 | 11/2007 | MacK | |
| 2008/0046130 A1 | 2/2008 | Faivre et al. | |
| 2015/0142250 A1 | 5/2015 | Cavender-Bares et al. | |
| 2015/0351309 A1 | 12/2015 | Gaus | |
| 2017/0325399 A1 | 11/2017 | Heinrich et al. | |

FOREIGN PATENT DOCUMENTS

| | | |
|---|---|---|
| WO | WO-2012/021687 A3 | 6/2012 |
| WO | WO-2017/106874 A1 | 6/2017 |

OTHER PUBLICATIONS

Office Action for corresponding European Application No. 17170416.6 dated Sep. 28, 2017.

Office Action for corresponding European Application No. 17170412.5 dated Sep. 28, 2017.

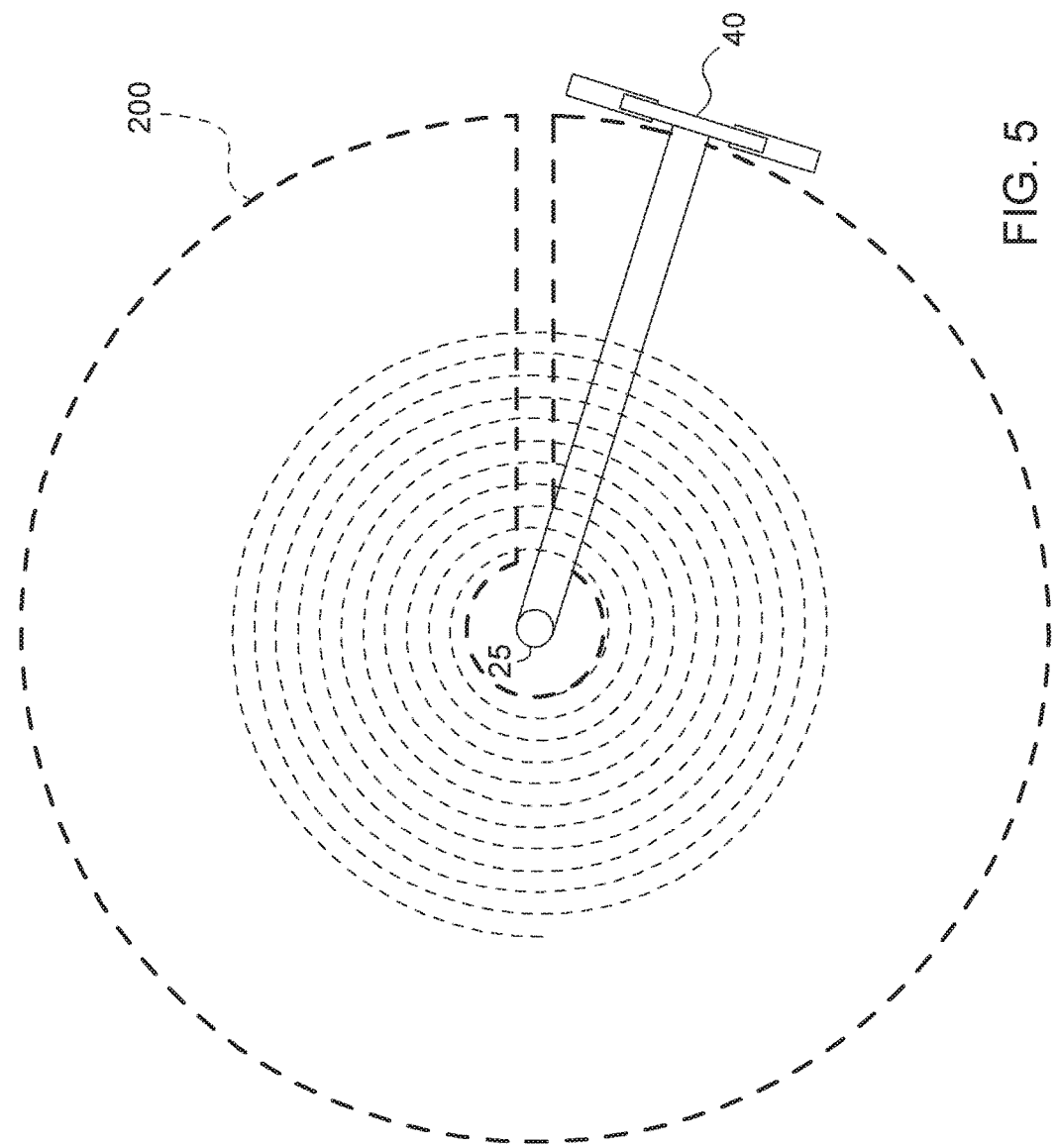

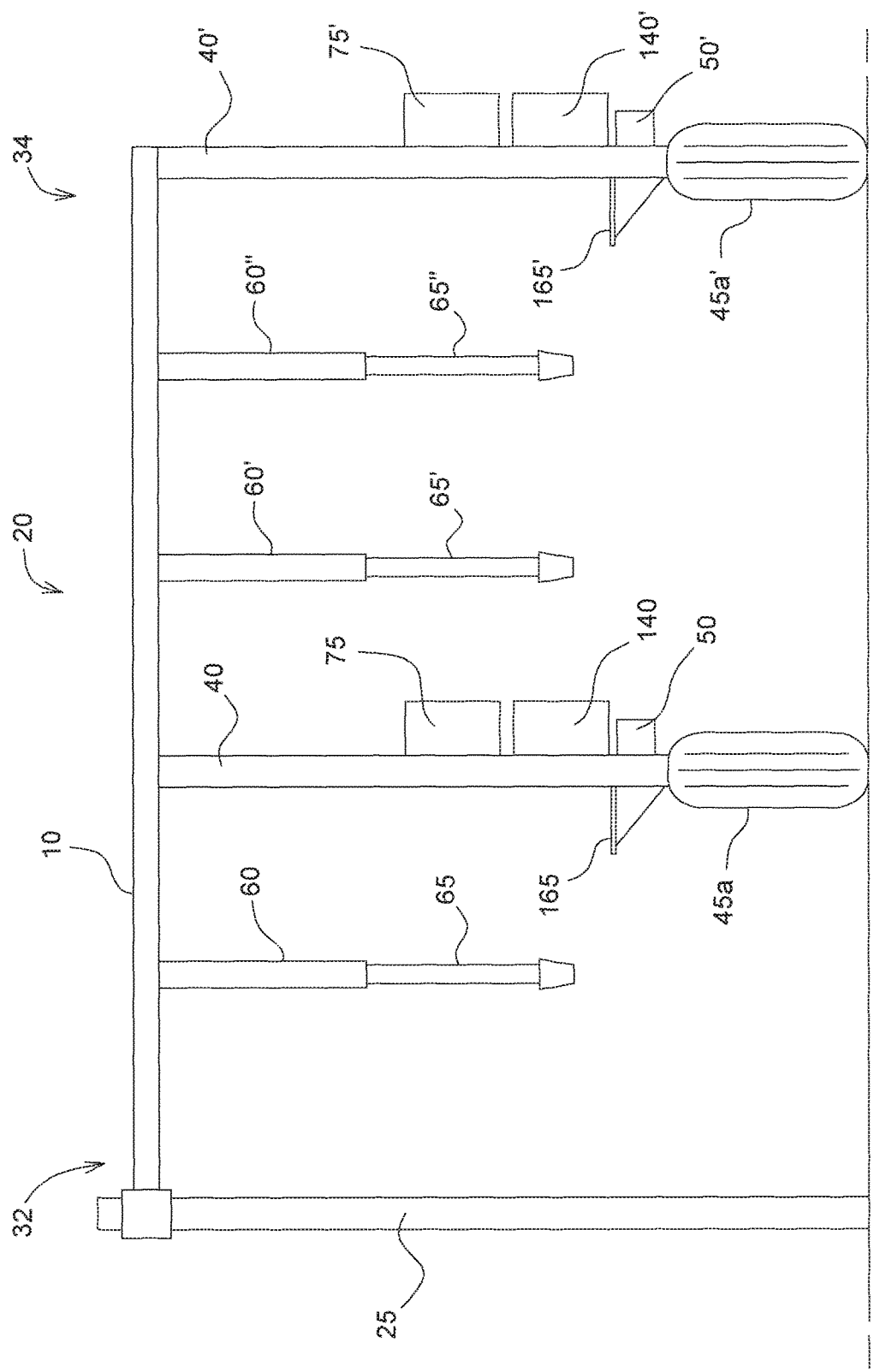

AUTOMATED FARMING SYSTEMS

CROSS-REFERENCE TO RELATED APPLICATIONS

This application claims priority under 35 U.S.C. § 119(e) to U.S. provisional patent application No. 62/335,846 filed May 13, 2016, the entire content of which is hereby incorporated by reference.

FIELD

Example embodiments are related to automated farming systems. Such methods and systems may be used to plant high density crops and increase crop yield.

BACKGROUND

Farming machinery for planting, watering, and feeding crops may include a beam supported by a set of heavy equipment tires that roll between rows of crops. Because of the size of the tires, the machinery primarily plants, waters and feeds, in straight rows, which may limit the density of the planting.

SUMMARY

An automated farming system comprises: a frame including, a fixed, central base configured to pivot, a beam including a first end and a second end, the first end of the beam movably connected to the fixed, central base, and at least one support connected to the beam, the at least one support being configured to rotate about the fixed, central base; and at least one farming implement attachable to at least one farming implement support, the at least one farming implement support being configured to move between the first end and the second end of the beam and being configured to move up and down in relation to the beam, movement of the support and the farming implement support being controllable.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 5 is a top view of a second plot and an automated farming system according to at least one example embodiment.

FIGS. 6A and 6B are illustrations of automated farming systems according to at least one example embodiment.

DETAILED DESCRIPTION

Figure 1:
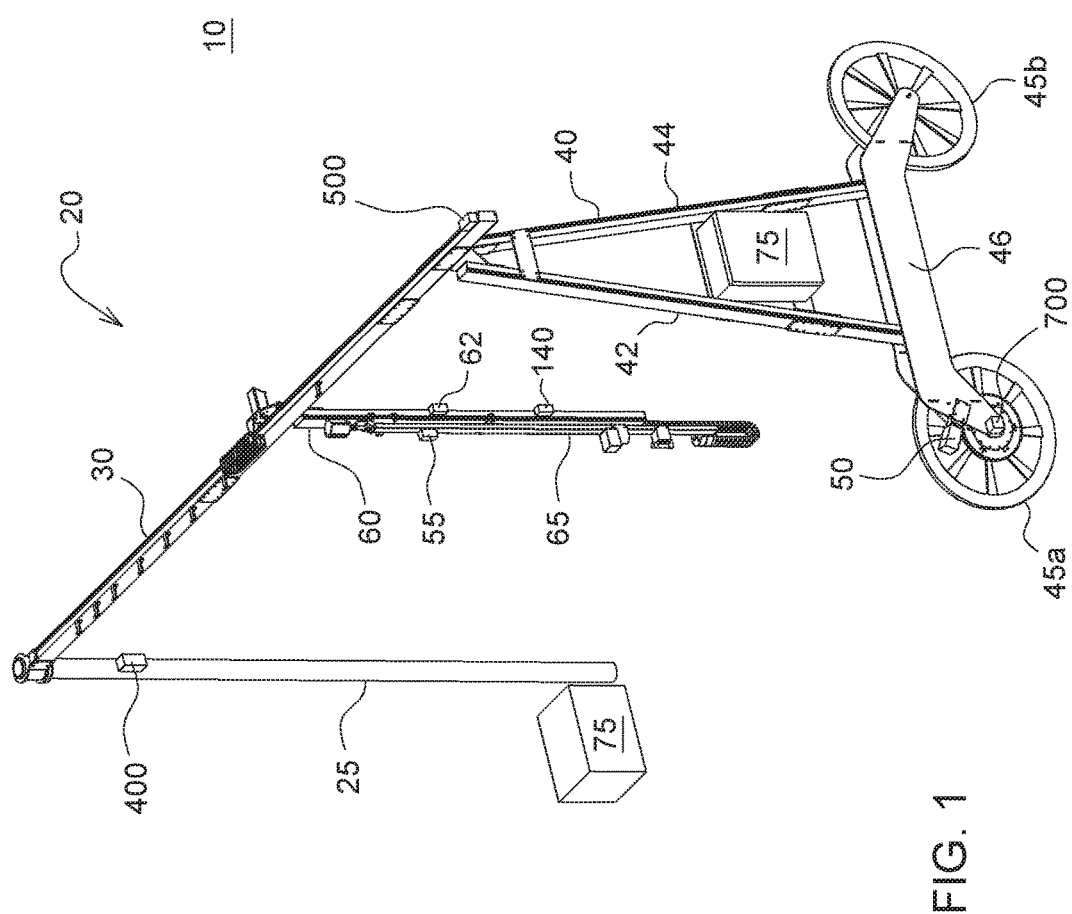
FIG. 1 is a perspective view of an automated farming system according to at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

The illustration and description thereof is presented for explanation only and is not intended to limit the scope of example embodiment.

At least some example embodiments relate to an automated farming system.

In at least one example embodiment, an automated farming system comprises: a frame including, a fixed, central base configured to pivot, a beam including a first end and a second end, the first end of the beam movably connected to the fixed, central base, and at least one support connected to the beam, the at least one support being configured to rotate about the fixed, central base. The automated farming system may also include at least one farming implement attachable to at least one farming implement support. The at least one farming implement support is configured to move between the first end and the second end of the beam. The at least one farming implement support is also configured to move up and down in relation to the beam. Movement of the support and the farming implement support are controllable.

In at least one example embodiment, the automated farming system may also include at least one propulsion assembly configured to rotate the support and the beam about the fixed, central base. The propulsion assembly includes a plurality of wheels and a first motor. The automated farming system may further comprise an encoder, associated with at least one of the plurality of wheels. The automated farming system may also include a second motor configured to move the farming implement support between the first end and the second end of the beam. At least one power supply is configured to supply power to at least one of the first motor and the second motor.

In at least one example embodiment, the farming implement includes at least one of a planting head, a liquid dispensing device, a weeding device, and a feeding system. The planting head may include a seed supply reservoir and a vacuum configured to pick up seeds from the seed supply reservoir. The planting head may also include an air nozzle configured to eject the seeds.

In at least one example embodiment, the liquid dispensing device includes at least one of: a liquid reservoir configured to contain at least one of water, a herbicide, and a plant nutrient; and a liquid supply line configured to supply at least one of water, the herbicide, and the plant nutrient.

The liquid dispensing device may further comprise at least one valve configured to selectively release the at least one of water and plant nutrients from the liquid reservoir or the liquid supply line.

In at least one example embodiment, the automated farming system may include a remotely located computing device, configured to send operating instructions, to remotely control movement of at least one of the at least one support and the at least one farming implement, to at least one of the first and second motors. The computing device includes a user interface. The computing device is in communication with at least one of the first and second motors via a motor controller. The computing device includes a data storage medium.

In at least one example embodiment, the automated farming system may include at least one of: a visual marker dispensing system; a differential global positioning system (GPS) receiver located at the second end of the beam; and an angle sensor located at the fixed, central base, the angle sensor configured to measure an angle of rotation of the beam.

In at least one example embodiment, the automated farming system may include at least one sensor configured to sense a condition of a plant, the at least one sensor connected to the farming implement support.

In at least one example embodiment, an automated farming system may include a frame including, a fixed, central base configured to pivot, a beam including a first end and a second end, the first end of the beam movably connected to the fixed, central base, and at least one movable support connected to the beam and configured to rotate the support and the beam about the fixed, central base. The automated farming system may also include at least one farming implement support configured to move between the first end and the second end of the beam. Movement of the at least one movable support and the at least one farming implement support may be controllable so as to farm crops in a substantially continuous row having a generally spiral shape. The row may extend from the fixed, central base to a location adjacent a path of the automated farming system.

In at least one example embodiment, the at least one movable support includes a propulsion system. The propulsion system may include a plurality of tires and a first motor.

In at least one example embodiment, the automated farming system may include an encoder associated with at least one of the plurality of tires.

In at least one example embodiment, the automated farming system may include a second motor configured to move the farming implement support between the first end and the second end of the beam.

In at least one example embodiment, the automated farming system may include at least one power supply configured to supply power to at least one of the first motor and the second motor.

In at least one example embodiment, the automated farming system may include at least one farming implement attachable to the farming implement support. The farming implement may include at least one of a planting head, a liquid dispensing device, a weeding device, and a feeding system.

In at least one example embodiment, the planting head comprises: a seed supply reservoir; and a vacuum configured to pick up seeds from the seed supply reservoir. The planting head may further comprise: an air nozzle configured to eject seeds.

In at least one example embodiment, the liquid dispensing device comprises at least one of: a liquid reservoir configured to contain at least one of water, a herbicide, and a plant nutrient; and a liquid supply line configured to supply at least one of water, the herbicide, and the plant nutrient. The liquid dispensing device may also include at least one valve configured to selectively release the at least one of water and plant nutrients from the liquid reservoir or the liquid supply line.

In at least one example embodiment, the automated farming system may include a remotely located computing device, configured to send operating instructions, to control movement of at least one of the at least one support and the at least one farming implement, to at least one of the first and second motors via a motor controller. The remotely located computing device includes a user interface. The remotely located computing device includes a data storage medium.

In at least one example embodiment, the automated farming system may include at least one of: a visual marker dispensing system; a differential global positioning system (GPS) receiver located at the second end of the beam; and an angle sensor located at the fixed, central base, the angle sensor configured to measure an angle of rotation of the beam.

In at least one example embodiment, the automated farming system may include at least one sensor configured to sense a condition of a plant. The at least one sensor may be connected to the farming implement support.

In at least one example embodiment, at least one of the first and second motors is in wireless communication with a remote computing device via a motor controller.

At least one example embodiment relates to an automated farming method.

In at least one example embodiment, an automated farming method comprises rotating a beam about a fixed, central base, the beam extending between the fixed, central base, and a movable support; moving a farming implement support along the beam; and depositing at least one of seeds, water, or nutrients along a continuous path within a plot as the beam rotates about the fixed, central base and the farming implement support moves along the beam from a first position to a second position, the continuous path forming a spiral pattern extending from the fixed, central base.

In at least one example embodiment, the method may also include continuously monitoring a condition of the plot. The method may also include treating selected plants within the plot according to the condition thereof.

In at least one example embodiment, at least one of the rotating and moving is wirelessly controlled.

In at least one example embodiment, an automated farming method comprises rotating a beam about a fixed, central base, the beam extending between the fixed, central base, and a support; moving a farming implement support along the beam; and depositing at least one of seeds, water, or nutrients in rows extending radially from the fixed, central base.

In at least one example embodiment, the method may include continuously monitoring a condition of the rows. The method may also include treating selected plants within the rows according to the condition thereof.

In at least one example embodiment, at least one of the rotating and moving is wirelessly controlled.

FIG. 1 is a perspective view of an automated farming system according to at least one example embodiment.

In at least one example embodiment, as shown in FIG. 1, an automated farming system 10 is configured to pivot about a fixed, central base 25.

In at least one example embodiment, the automated farming system 10 may include a frame 20 as shown in FIGS. 1-6. The frame 20 includes the fixed, central base 25, a support 40, and a beam 30. The beam 30 includes a first end 32 that is movably attached to the fixed, central base 25. The beam 30 also includes a second end 34 that is attached to the support 40. At least one farming implement support 60 is movably attached to the beam 30. The farming implement support 60 is configured to move between the first end and the second end of the beam 30 and the farming implement support 60 is configured to move up and down in relation to the beam 30. At least one farming implement 65 is attachable to the farming implement support 60.

A propulsion assembly may be configured to rotate the farming implement support 60 and the beam 30 about the fixed, central base 25. The propulsion assembly may include a motor 50 and/or at least one wheel or tire 45a, 45b connected to the support 40.

A control and/or power supply panel 75 may house a power supply and a controller. The controller may be configured to control movement of the support 40 and the farming implement support 60. The controller may be wirelessly connected to the automated farming system 10. In other example embodiments, the controller is hardwired to the automated farming system 10. In at least one example embodiment, the controller may include an integrated circuit within the control and/or power supply panel 75.

When the controller is wireless, transceivers 415a, 415b (shown in FIG. 9B) may be included. A first transceiver 415a may be attached to the automated farming system 10, while a second transceiver 415b may be associated with a remote computing device used to remotely control the automated farming system 10. The automated faming system 10 may include a power supply hardwired to and configured to supply power to motors and a motor controller associated with the motors. Signals may be wirelessly sent to and/or from the motor controller via the transceivers 415a, 415b to activate and/or deactivate the motor. Further details of the control system will be explained later. Movement of the farming implement support 60 (and a farming implement support) may also be controllable.

In at least one example embodiment, the support 40 rotates around the fixed, central base 25 and is driven by a motor 50, for example the motor associated with at least one of the wheels 45a, 45b. The control system includes an on board motor controller that is wired to the motors to provide signal and power thereto. The support 40 may rotate clockwise or counter-clockwise around the fixed, central base 25. The rotation may be substantially continuous. Alternatively, the support 40 may stop at selected locations around the plot for desired periods of time.

The rotation may be controlled by a control system and/or controller, which may be programmed, for example to stop and/or start rotation at selected times and/or for selected periods of time. The control system and/or controller may be remotely located or located at the automated farming system 10. In at least one example embodiment, the control system and/or controller includes a user interface 88 (shown in FIG. 7), such as a touch screen. A farmer or other individual may input instructions to the automated farming system 10, review crop health, and/or review system status via the user interface 88.

In at least one example embodiment, a remote computer system may be configured to send operating instructions to a controller and/or directly to the motors (for example, in a known wireless manner). The controller and/or remote computer system may further include a user interface, a data storage medium, and/or may be in communication with a remote computing device. The remote computing device may be a smartphone, laptop computer, desktop computer, tablet, or other device.

In at least one example embodiment, the user interface may be a personal computer running Windows OS and using a G-code user interface to send a G-code text file with standard ANSI G language commands. The user interface may be used to send line by line programming commands to the motor controller. The motor controller may be programmed with a G-code interpreter that may process and/or execute the commands.

In at least one example embodiment, a proprietary language using technology, such as a JD 4600 display and hardware controller, may use a GPS location instead of absolute positioning in order to command location and movement.

The at least one farming implement support 60 is configured to move laterally along the beam 30 between the first end 32 and the second end 34 of the beam. The at least one farming implement support 60 may also move up and down in relation to the beam 30. A second motor is configured to move the at least one farming implement support 60 laterally and/or up and down, etc. The second motor is controllable by the controller which may be programmed to control the second motor and to control the movement of the at least one farming implement support 60 (and the controller may be programmed to control the motor 50 to control rotation of the support 40 rotates around the fixed, central base 25). A remote computer system may be configured to send operating instructions to the controller and/or the motor 50 (for example, in a known wireless manner). The controller and/or remote computer system may further include a user interface, a data storage medium, and/or may be in communication with a remote computing device.

At least one at least one power supply may be configured to supply power to at least one of the first motor 50, the second motor, or the control system/controller. Thus, the automated farming system 10 is configured to move in at least three different directions within a plot so as to position the at least one farming implement 65 in any location within the plot.

The automated farming system 10 is configured to operate 24 hours a day, seven days a week to plant, water, and feed crops and/or apply herbicides, fungicides, insecticides, and/or weed control without the need for human intervention. Moreover, because the automated farming system 10 is movable in three at least directions (x-axis, y-axis, and rotationally) within the plot, crops may be farmed in dense and substantially precise patterns, such as for example a spiral, a hexagonal, diamond, or a circular pattern, which may increase crop density and crop harvest. The pattern may be chosen to provide dense planting of crops with the plants be substantially equidistant within the plot.

In at least one example embodiment, the automated farming system 10 may be programmed such that the crop planting and maintenance paths are the most efficient and/or require the least motion to reach each plant within the plot.

In another example embodiment, the automated farming system 10 may include external sensors (discussed in detail hereafter) that sense plant deficiency or stress so that only the deficient or stressed plants within the plot are treated with water, nutrients, or other materials, as desired. The use of the external sensors may further enhance the efficiency of the automated farming system 10.

Moreover, since the automated farming system 10 rotates about the fixed, central base 25, the wheels 45a, 45b do not pass between rows of plants. Thus, the plants may be planted close together. Precision planting may allow for high density crop planting. For example, an example embodiment of the automated farming system 10 may plant about 70,000 corn seeds per acre to enable harvesting of about 400 bushels per acre. Thus, each plant may be allotted about 254 mm within the plot. Plant population and spacing within the plot may vary depending on the soil, seed type, variety of seed, nutrient strategy, and target yield goal. The automated farming system 10 may be used on any size plot with any desired crop size. For example, the automated farming system 10 may be used to farm a plant population ranging from about 28,000 to about 38,000 plants per acre. The automated farming system 10 may also enable farming of plots having more densely planted crops without crowding adjacent plants.

The automated farming system 10 may also be able to manually weed, till, or otherwise manipulate the crops by attaching the at least one farming implement 65 as described herein. Precision farming may also preserve resources and provide larger harvests per acre than traditional row planting. Moreover, because the automated farming system 10 is autonomous and may operate 24 hours a day in all weather conditions, the crops may be maintained immediately upon sensing of adverse weather, plant, and/or other environmental conditions.

In at least one example embodiment, the fixed, central base 25 may be permanently or temporarily installed within the plot. The plot may be any desired size. The beam 30 spans a radius of the plot.

The frame 20 may be formed of any suitable material including wood, plastic, and/or metal. In at least one example embodiment, the frame 20 may be formed of steel or aluminum. In at least one example embodiment the frame 20 is formed of stainless steel or other non-ferrous materials since the frame 20 may be exposed to harsh chemicals and/or weather conditions. Alternatively, the frame 20 may be formed of other materials that are coated with polymers or other materials that protect the frame 20 from chemicals and/or weather conditions.

In at least one example embodiment, the beam 30 may have a length ranging from about 1 foot to about 200 feet or more (e.g., about 10 feet to about 180 feet, about 20 feet to about 150 feet, about 30 feet to about 125 feet, 50 feet to about 100 feet, or about 70 feet to about 90 feet). The length of the beam 30 may be adjusted based on a desired plot size to be farmed. The length of the beam 30 may be adjustable so that a farmer may choose the desired beam length.

In at least one example embodiment, a height of the fixed, central base 25, beam 30, and/or the support 40 may range from about 1 foot to about 50 feet or more (e.g., about 5 feet to about 45 feet, about 10 feet to about 40 feet, about 15 feet to about 35 feet, or about 20 feet to about 30 feet). The height may be chosen based on a height of the crop planted. Thus, the beam 30 may be higher for corn than for squash.

In at least one example embodiment, the height of the beam 30 may be adjustable with respect to the fixed, central base 25 and the support 40. In another example embodiment, the height of the beam 30 may be fixed and may be based on the height of the fixed, central base 25 and/or the support 40. The height of the central base 25 and/or the support 40 may also be adjustable alone or in combination with the beam 30.

In at least one example embodiment, both of the wheels 45a, 45b of the support 40 may be powered by the motor 50. In another example embodiment, one of the wheels 45a, 45b may be powered, while a second one of the wheels 45a, 45b may not be powered. In other embodiments, both wheels 45a, 45b may be powered by two or more motors.

In at least one example embodiment, the size of the wheels 45a, 45b may be chosen so that the load factor does not exceed ground pressure and cause the tires to sink. The wheels 45a, 45b must be wide enough and tall enough to reduce and/or substantially eliminate vertical motion due to bumps in the field and wide enough to support the beam 30 and support 40 without sinking into the field.

In at least one example embodiment, the wheels 45a, 45b may be substantially smaller than heavy equipment tires that may be used for some commercial farming machinery. For example, the wheels may have a width ranging from about 1 inch to about 15 inches (e.g., about 2 inches to about 12 inches or about 5 inches to about 10 inches). The use of narrower wheels may allow for planting in more intricate patterns with higher plant density.

In at least one example embodiment, the automated farming system 10 may include an encoder 700, such as a rotary encoder or a linear encoder. The encoder 700 may be associated with at least one of the wheels and is configured to convert an angular position or motion of a shaft associated with the wheels 45a, 45b to an analog or digital code. The code may be interpreted by the control system to determine a location of the support 40 within a plot. Thus, the encoder 700 may record and maintain information regarding position of the wheels 45a, 45b within the plot.

For example, the location of the wheels 45a, 45b and the support 40 may be used to control position of the farming implement support 60 and release of seeds, water, nutrients, and/or other desirable materials via the farming implement 65. Thus, the location of the release of seeds, water, nutrients, and/or other desirable materials may be substantially precisely controlled.

The automated farming system 10 may include at least one of a visual marker dispensing system; a differential global positioning system (GPS) receiver located at the second end of the beam; and/or an angle sensor located at the fixed, central base. The angle sensor is configured to measure an angle of rotation of the beam.

In an example embodiment, in order to monitor location of the beam 30 and/or the support 40, the automated farming system 10 may include a visual marker dispensing system to intermittently release markers in the plot. A control system may reference the location of previously planted seeds and/or the markers to determine position of the support 40 within the plot.

In yet another example embodiment, the automated farming system 10 may include a geographical positioning system (GPS) receiver 500 on or adjacent the beam 30. The GPS receiver may provide a reference position to the control system or controller so as to indicate position of the beam 30 within the plot. The reference position may be compared against an odometer associated with the wheels 45a, 45b so as to confirm location of the support 40 and ensure precise planting, watering, weeding, and/or feeding locations.

In another example embodiment, the automated farming system 10 may include an angle sensor 400 on or adjacent the fixed, central base 25. The angle sensor 400 may measure an angle of rotation of the beam 30 so as to determine the position of the beam 30 within the plot.

In at least one example embodiment, the automated farming system 10 may use absolute positioning based on feedback sensors, such as, for example rotary potentiometers or a GPS antenna, to monitor the location of one or more of the beam 30; the fixed, central base 25; the support 40; the farming implement support 60; and the farming implement 65.

In at least one example embodiment, the support 40 may include one or more portions (or legs). As shown in FIG. 1, the support 40 may include two legs 42, 44. A secondary support 46 may extend between the two legs 42, 44 to reinforce the support 40. The legs 42, 44 may have a width and depth sufficient to support the beam 30. The legs 42, 44 are attached to the wheels 45a, 45b, such that the support 40 moves as the wheels move. The wheels 45a, 45b may be removable for easy replacement and/or storage of the frame 20. In other example embodiments, the support 40 may include additional legs and wheels to support larger beams 30, if necessary.

In at least one example embodiment, the farming implement support 60 may move fully or partially along the length of the beam 30 as desired. A belt and linear gear or notch belt drive (not shown) may move the farming implement support 60 along the beam 30.

The beam 30 may rotate around the fixed, central base 25, and the farming implement support 60 may move along the beam 30 to selected locations within the plot. Since the farming implement support 60 also moves up and down with relation to the beam 30, the farming implement 65 is able to be moved within three different directions (axes) so that any area of the plot may be treated. In at least one example embodiment, the automated farming system 10 may move in all three directions at the same time. In other example embodiments, the automated farming system 10 may move in only one or two directions at a time.

In at least one example embodiment, as set forth above, absolute positioning may be used to determine location of the components of the automated farming system 10 within the plot. In addition, a location of each seed and/or plant within the plot may also be mapped. The external sensors may be used to determine a condition of each seed and/or plant. Then, the controller may be used to input specific instructions regarding positioning of each component of the automated farming system 10 within the field, the necessary action to be taken for each individual plant or group of plants, the timing of the action, the length of the action, and whether the action should be repeated.

For example, the farming implement 65 may be positioned close to the ground during planting and/or watering, but may be positioned higher during harvest or when applying insecticides to leaves or canopy of a plant.

In at least one example embodiment, the farming implement support 60 is configured to attach to the farming implement 65. The farming implement 65 may be removed and replaced with other farming implements 65, if desired.

The farming implement 65 may be, for example, a planting head, a liquid dispensing device, a plow, a nozzle, a vacuum, a sprayer, a light, a harvesting device, a sensor, a weeding device, a feeding system, or any other suitable farming implement. The liquid dispensing device may dispense water, fertilizers, nitrogen, phosphorous, starter fertilizers, insecticides, bio stimulants, and/or herbicides as desired.

In other example embodiments, the beam may be longer and may include a cable support or suspension structure.

In at least one example embodiment, the weeding device may include mechanical weeding implements and/or a nozzle for dispensing a herbicide. Further, the planting head may include an air nozzle, a blower, a vacuum, and optionally a mechanical device, such as a small plow for forming a hole or trough in the soil into which one or more seeds may be deposited. The vacuum may be configured to suck up one or more seeds from a seed supply reservoir. The air nozzle may be configured to dispense or eject the one or more seeds into a selected location of the plot by blowing air through the nozzle along with the one or more seeds. The air may be supplied by a blower. In another example embodiment, the seeds may be gravity fed through the nozzle.

In least one example embodiment, for example where the farming implement 65 includes a weeding device, an additional axis of rotation may be implemented and/or an additional motor may be included to allow rotation of the farming implement 65, such as the weeding device in the soil in order to till a small seed zone.

In at least one example embodiment, liquid may be contained in a liquid reservoir 140 attached to or adjacent the farming implement 65. Alternatively, the liquids and/or seeds may be delivered to the farming implement 65 via one or more supply lines (not shown). The liquid dispensing device may include at least one of the liquid reservoir 140 configured to contain at least one of water, a herbicide, and a plant nutrient, and a liquid supply line configured to supply at least one of water, the herbicide, and the plant nutrient. The liquid dispensing device may further include at least one valve (not shown) configured to selectively open and/or close so as to release a desired amount of water and/or nutrients from a liquid supply line or liquid reservoir 140 at a selected location of the plot. The liquid may be water and any nutrient, fertilizer, fungicide, insecticide, herbicide, and the like. An example embodiment will be discussed with regard to FIG. 2.

In at least one example embodiment, for accurate liquid distribution, a precise valve, such as a pulse width modulation (PWM) valve may be used.

In at least one example embodiment, harvesting may require an air delivery system to transfer harvested plant materials to the fixed, central base 25 or to the support 40 for removal from the plot via truck or other device.

In at least one example embodiment, the farming implement support 60 may include at least one sensor (external sensor), for example at least one weather and/or plant health sensor 62. The sensor 62 may be configured to monitor weather conditions and/or condition of plants. The at least one sensor may be connectable to the farming implement support 60. The sensor 62 may be a normalized difference vegetation index (NDVI) sensor that measures greenness of each individual plant so as to determine plant stress from environmental factors such as water supply, insects, nutrients, fungus, and the like.

Since the sensor 62 may determine health of each individual plant within the plot, each individual plant may be treated with the appropriate amounts of water, nutrients, bio stimulants, insecticides, fungicides, and/or the like. Thus, for example, instead of applying a fixed amount of a particular material to an entire plot, a desired first amount may be applied to a first plant, while a second (different) amount may be applied to a second plant. Accordingly, resources are saved. Moreover, since the system 10 is automated, the system 10 may instantly, or within a short period of time, provide the needed nutrients, etc. to the plant rather than awaiting human intervention, which may be delayed due to weather conditions or other factors.

The farming implement support 60 may be associated with a motor 55 that is configured to drive movement of the farming implement support 60 up or down with respect to the beam 30. A constant force spring (not shown) may be used to apply force to and/or hold the farming implement support 60 in place. Thus, while the motor controls motion of the farming implement support 60, the spring applies the necessary force for movement and/or maintenance of the positioning of the farming implement support 60.

In at least one example embodiment, the automated farming system may also include the control and/or power supply panel 75. The control and/or power supply panel 75 may be located adjacent the fixed, central base 25, adjacent the support 40, or at any other suitable location. In at least one example embodiment, the control and/or power supply panel 75 includes one or more power supplies, sensors, and the control system. The one or more power supplies are configured to supply power to the first motor 50 and any additional motors, which drive the movement of the farming implement support 60 along the beam 30 and up and down in relation to the beam 30; and to supply power to the controller or control system. The sensors are configured to sense a location of the support 40 in relation to the fixed, central base 25 and a location of the farming implement support 60 along the beam 30. The control system is configured to control movement of the farming implement support 60, the wheels 45a, 45b, and release of the seeds, water, and/or nutrients from the farming implement 65.

Figure 2:
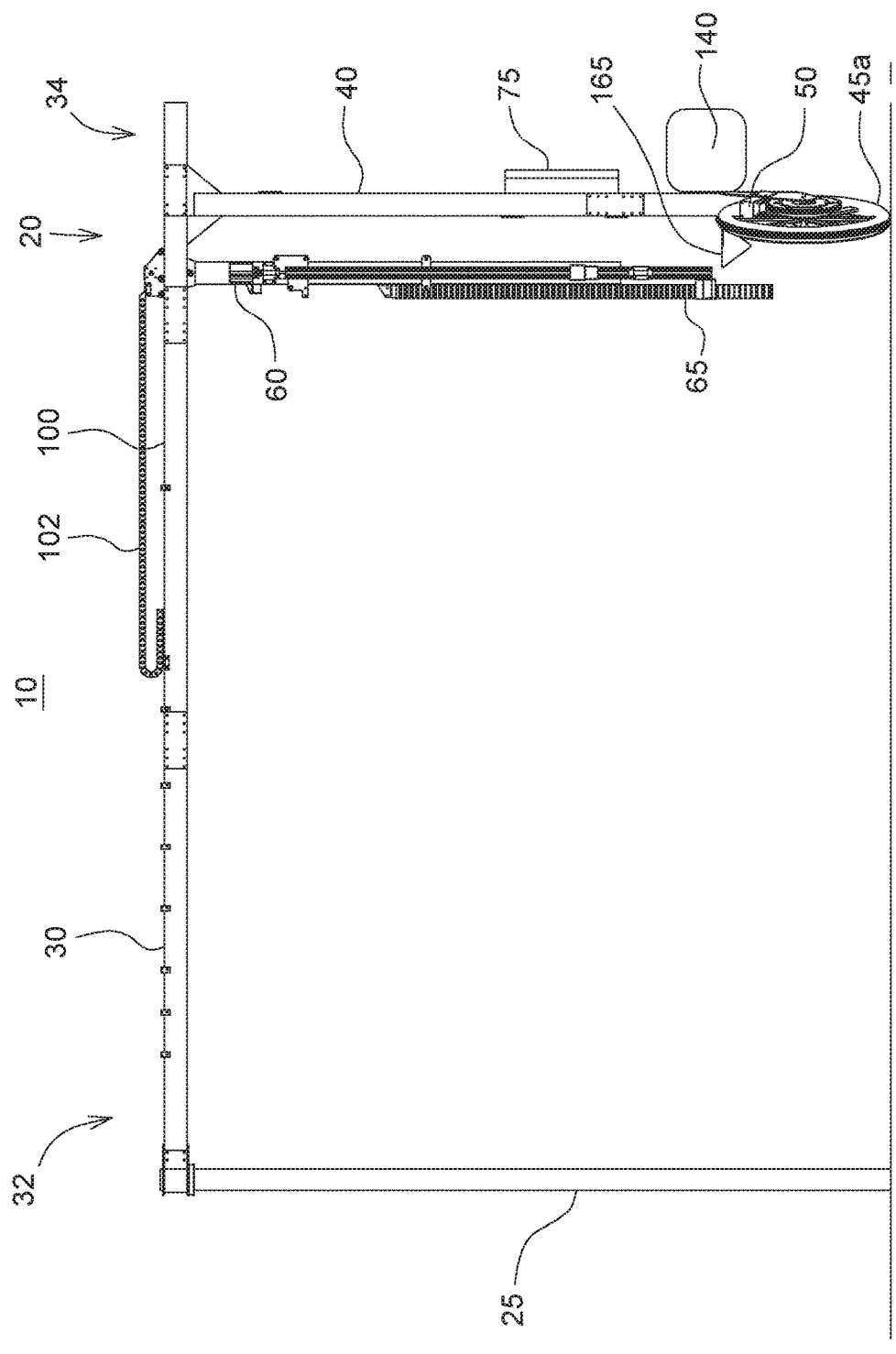
FIG. 2 is a front view of the automated farming system of FIG. 1 according to at least one example embodiment.

FIG. 2 is a front view of the automated farming system of FIG. 1 according to at least one example embodiment.

In at least one example embodiment, as shown in FIG. 2, the automated farming system 10 is generally the same as in FIG. 1, but illustrates a wire shield 102, a seed reservoir 165, and a reservoir 140.

As shown in FIG. 2, the automated farming system 10 may include the wire shield 102, which is a cover that rolls along the beam 30 as the farming implement support 60 moves. The wire shield 102 shields wires and tubes extending along the beam and leading to the farming implement 65 from various weather conditions and/or chemicals.

In at least one example embodiment, the automated farming system 10 may include a reservoir 140 supported by the support 40. The reservoir 140 may contain one or more of water, fertilizers, and/or other nutrients in liquid and/or dry form within one or more compartments in the reservoir 140. The reservoir 140 may include one or more outlets and one or more valves associated therewith. The valves may be opened and closed to selectively release liquids (or other materials) from the reservoir 140. Once opened, materials from multiple compartments may be released and mixed together in a mixing chamber (not shown) prior to being released via a liquid dispensing device, such as a nozzle.

In at least one example embodiment, the automated farming system 10 may include a seed supply 165 attached to the support 40. In other example embodiments, the seed supply 165 may be attached to the beam 30 or to the fixed, central base 25. The seed supply 165 may contain a plurality of seeds to be planted. During planting, the farming implement 65 may be a planting head including a vacuum that is configured to suck up one or more seeds to be planted. The planting head may also include a blower configured to blow the seed from the planting head into the soil to a desired depth.

In other example embodiments, instead of including the seed reservoir 165 and the reservoir 140, seeds, water, nutrients, fertilizers, insecticides, fungicides, herbicides, and the like may be contained in tanks located in other areas, such as adjacent the fixed, central base 25. Pipes or tubes and pumps may be associated with the seed reservoir 165 and/or the reservoir 150 to deliver the seeds, water, nutrients, fertilizers, insecticides, fungicides, herbicides, and the like to the farming implement 65.

Figure 3:
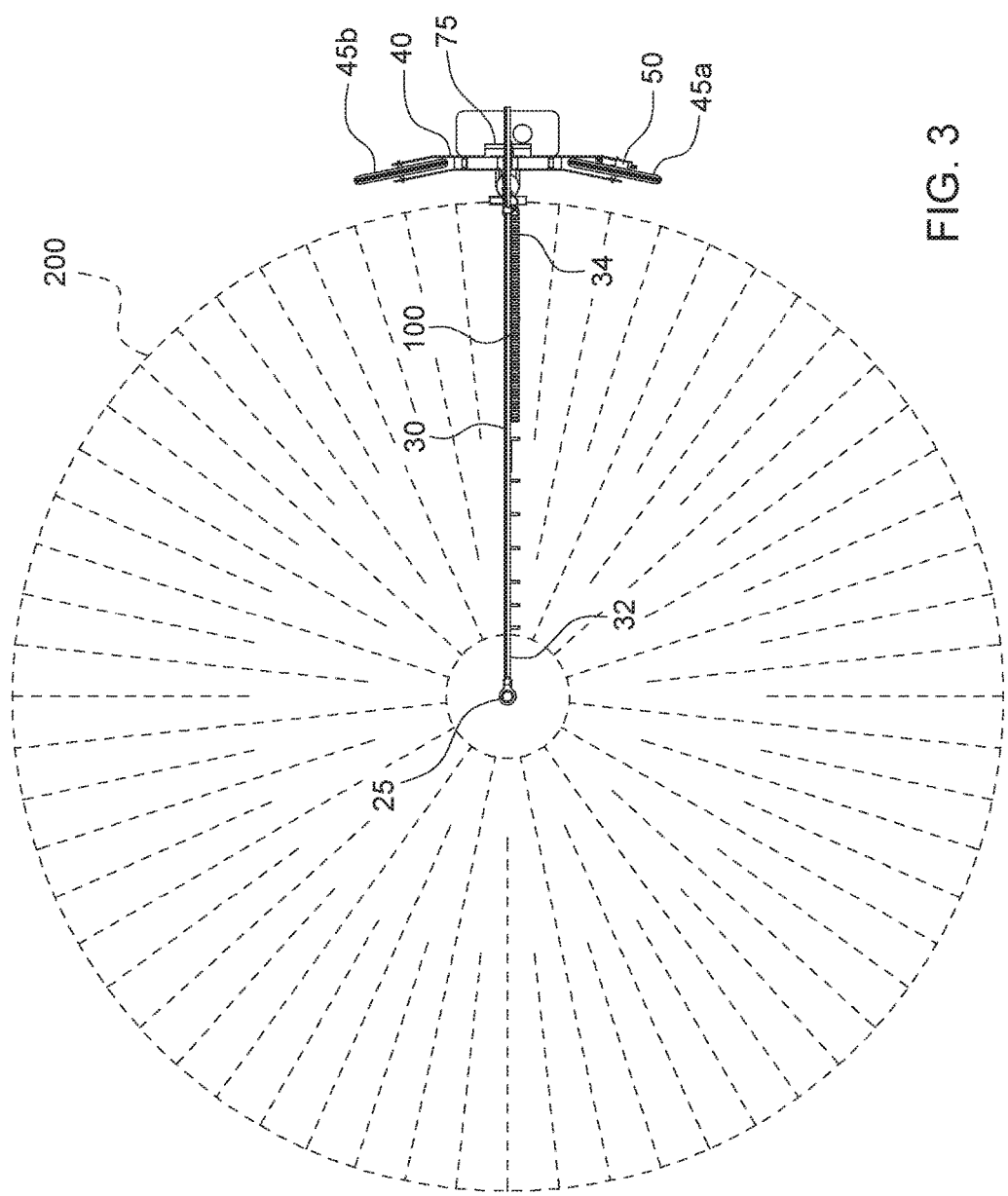
FIG. 3 is a top view of a first plot and an automated farming system according to at least one example embodiment.

FIG. 3 is a top view of a first plot and an automated farming system according to at least one example embodiment.

In at least one example embodiment, the fixed, central base 25 may be centrally positioned within a plot 200. The support 40 rotates about the fixed, central base 25, while the farming implement support 60 moves between the first end 32 and the second end 34 of the beam 30. The plot 200 may have a radius ranging from about 1 foot to about 200 feet (e.g., about 5 feet to about 150 feet or about 8 feet to about 120 feet). The radius may depend upon the length of the beam 30.

As shown in FIG. 3, the plot 200 may include a plurality of rows extending radially from the fixed, central base 25. For example, the rows may have a planting pattern wherein 12 plants are planted in a first row, 7 plants in a second row, 10 plants in a third row, 7 plants in a fourth row, and then the pattern is repeated so as to form a generally hexagonal planting pattern. The rows may have about 254 mm between adjacent rows. The rows may be substantially uniformly spaced.

In at least one example embodiment, the type of seed/plant, soil conditions, and the like may be used to determine a desired plant spacing and pattern. Once the desired spacing and pattern is determined, the system 10 may be programmed to farm according to a relatively fastest path with a relatively least amount of motion required by the system 10. The fastest path may be calculated using any suitable mathematical technique including path optimizers.

Figure 4:
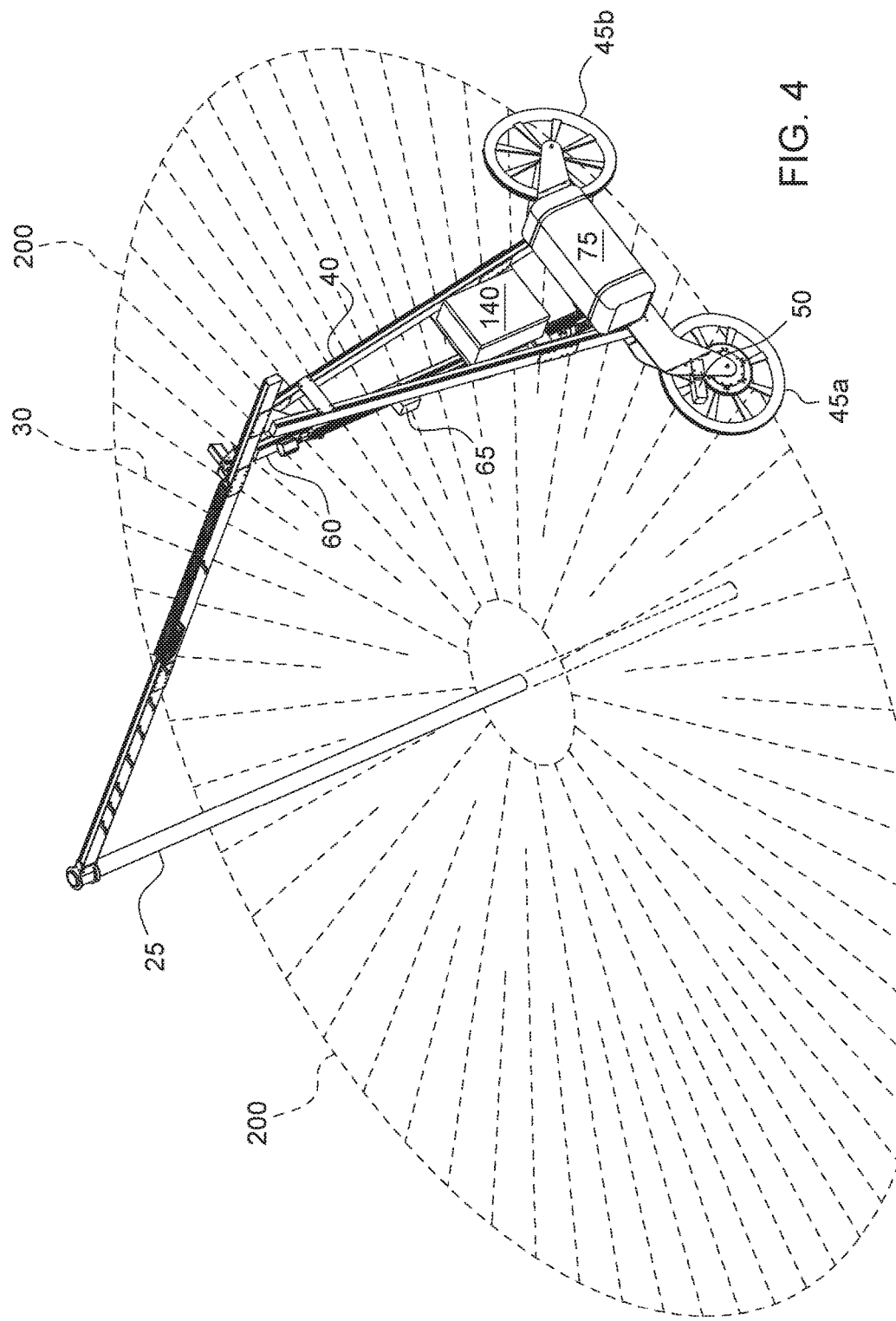
FIG. 4 is a perspective view of the first plot and the automated farming system of FIG. 3 according to at least one example embodiment.

FIG. 4 is a perspective view of the first plot and the automated farming system of FIG. 3 according to at least one example embodiment.

In at least one example embodiment, as shown in FIG. 4, the plot 200 and the automated farming system 10 are generally the same as in FIG. 3, but are shown including the farming implement 65 attached to the farming implement support 60.

FIG. 5 is a top view of a second plat and an automated farming system according to at least one example embodiment.

In at least one example embodiment, as shown in FIG. 5, the plot 200 may include a continuous spiral pattern radiating from the location of the fixed, central base 25. Adjacent sections of the coil may be spaced about 254 mm apart.

Since the spiral row is continuous, the farming implement 65 may be left in a "down" position with respect to the beam 30 during planting, watering, and/or feeding since the farming implement 65 may travel along the continuous path and would not need to be moved up and down to avoid adjacent plants. The farming implement 65 could be moved up with relation to the beam 30 in order to perform other operations, such as applying insecticides or harvesting crops, if desired.

To form the spiral row, each plant would have x, y, and z coordinates along the spiral path. The system 10 would be programmed to move the farming implement 65 between each plant in the most efficient direction.

FIG. 6A is a side view of a second embodiment of an automated farming system according to at least one example embodiment.

In at least one example embodiment, as shown in FIG. 6, the automated farming system 10 is generally the same as in FIG. 1, but includes a longer beam 30 and two supports 40, 40'. The automated farming system 10 may also include additional farming implement supports 60, 60', 60" and farming implements 65, 65', 65", the number of which may be chosen based on the size of the plot and number of plants within the plot. Each support 40, 40' may include wheels 45a, 45a' and motors 50, 50' that drive the wheels 45a, 45a'. In addition, each support 40, 40' may include a separate seed reservoir 165, 165', a separate liquid reservoir 140, 140', and a separate control and power supply panel 75, 75'.

Each support 40, 40' along the beam 30 may be substantially uniformly or non-uniformly spaced between the fixed, central base 25 and the second end 34 of the beam 30. The farming implement supports 60, 60', 60" may move independently or in sync with others of the farming implement supports 60, 60', 60".

In other example embodiments, the automated farming system may include additional supports, wheels, reservoirs, farming implement supports, and farming implements based on the length of the beam.

Figure 6B:
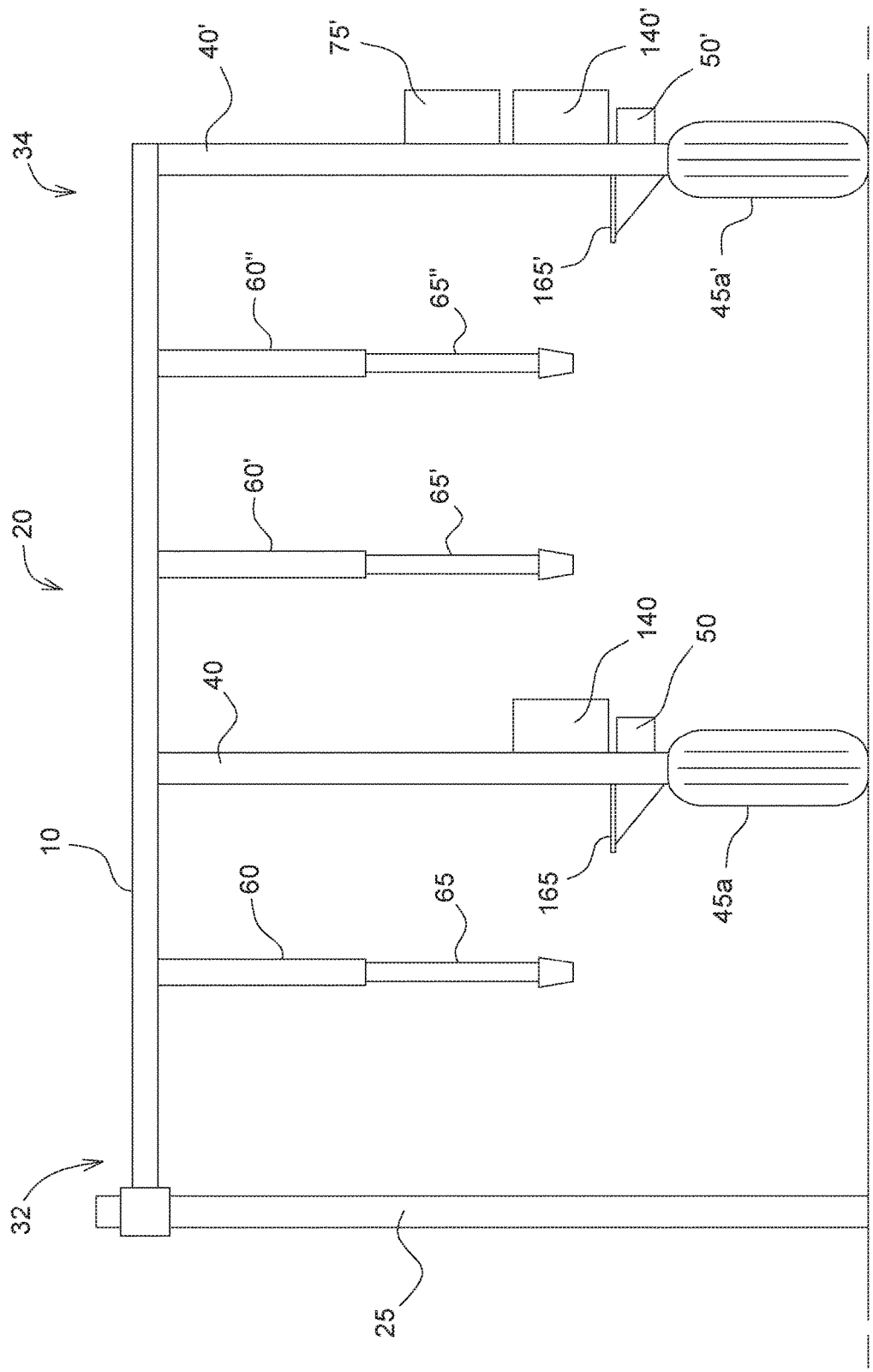

FIG. 6B is a side view of a third embodiment of an automated farming system according to at least one example embodiment.

In at least one example embodiment, as shown in FIG. 6B, the automated farming system 10 is the same as in FIG. 6A, but may include a single control system 75 that controls a plurality of farming implement supports 60, 60', 60" and supports 40, 40'.

Figure 7:
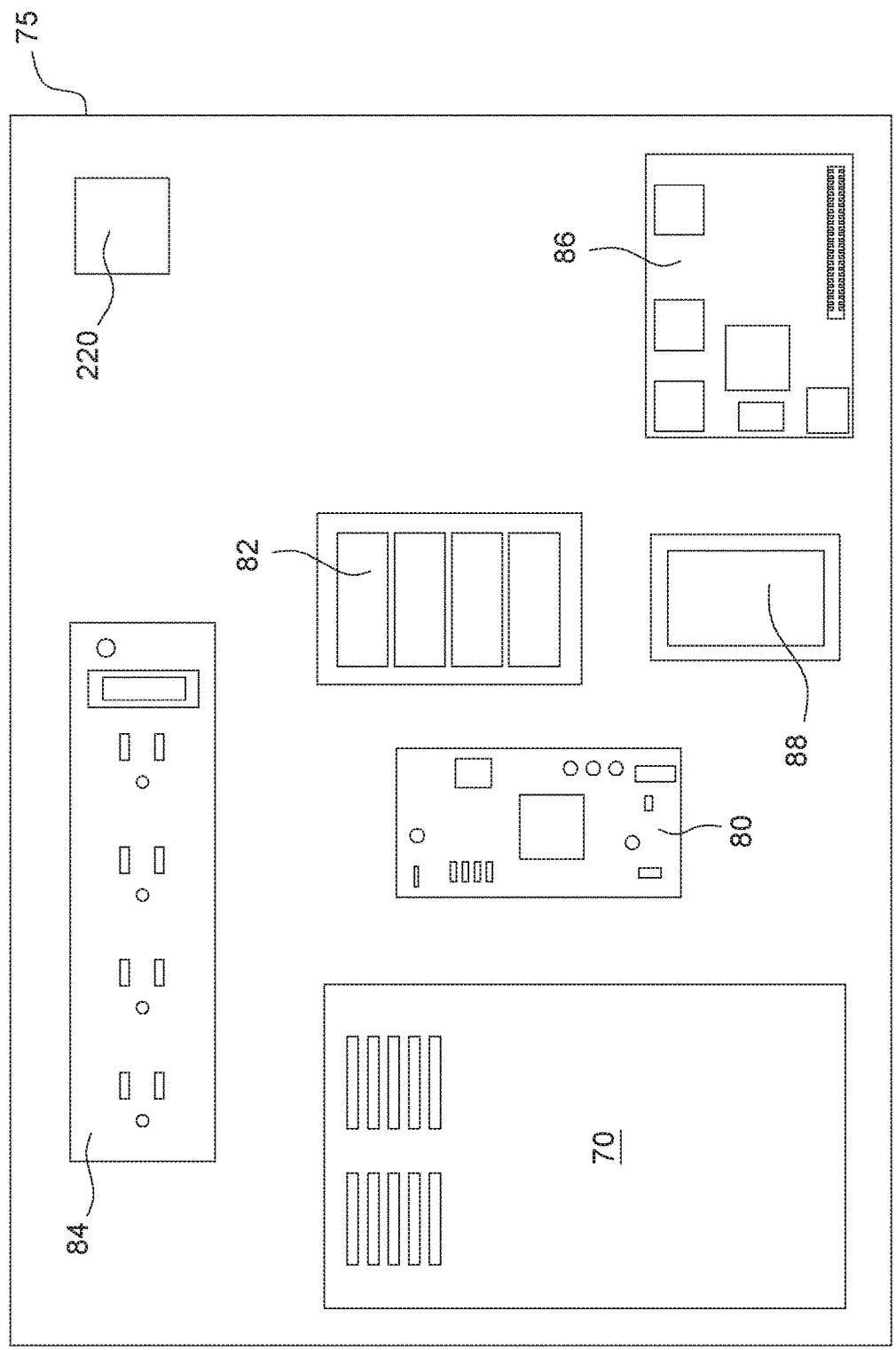
FIG. 7 is a top view of a control panel of an automated farming system according to at least one example embodiment.

FIG. 7 is a top view of a control system and power supply panel of an automated farming system according to at least one example embodiment.

In at least one example embodiment, the automated farming system of FIGS. 1-6 (including the motors) may be wirelessly connected to the control system and power supply panel 75 of FIG. 7. As shown, the control system and power supply panel 75 may include a power supply 70, which may include a 5 volt and/or a 12 volt converter, a stepper motor controller 80, a relay 82, a power input 84, a computer control board 86, and a user interface 88. The control system and power supply panel 75 may also include a WIFI connection 220 for communication with a remote computing device or system (not shown), configured to send operating instructions to the motors.

In at least one example embodiment, the control system may be run with controllers, such as a TruSet controller or an Autosteer controller. Any suitable controller may be used.

Figure 8:
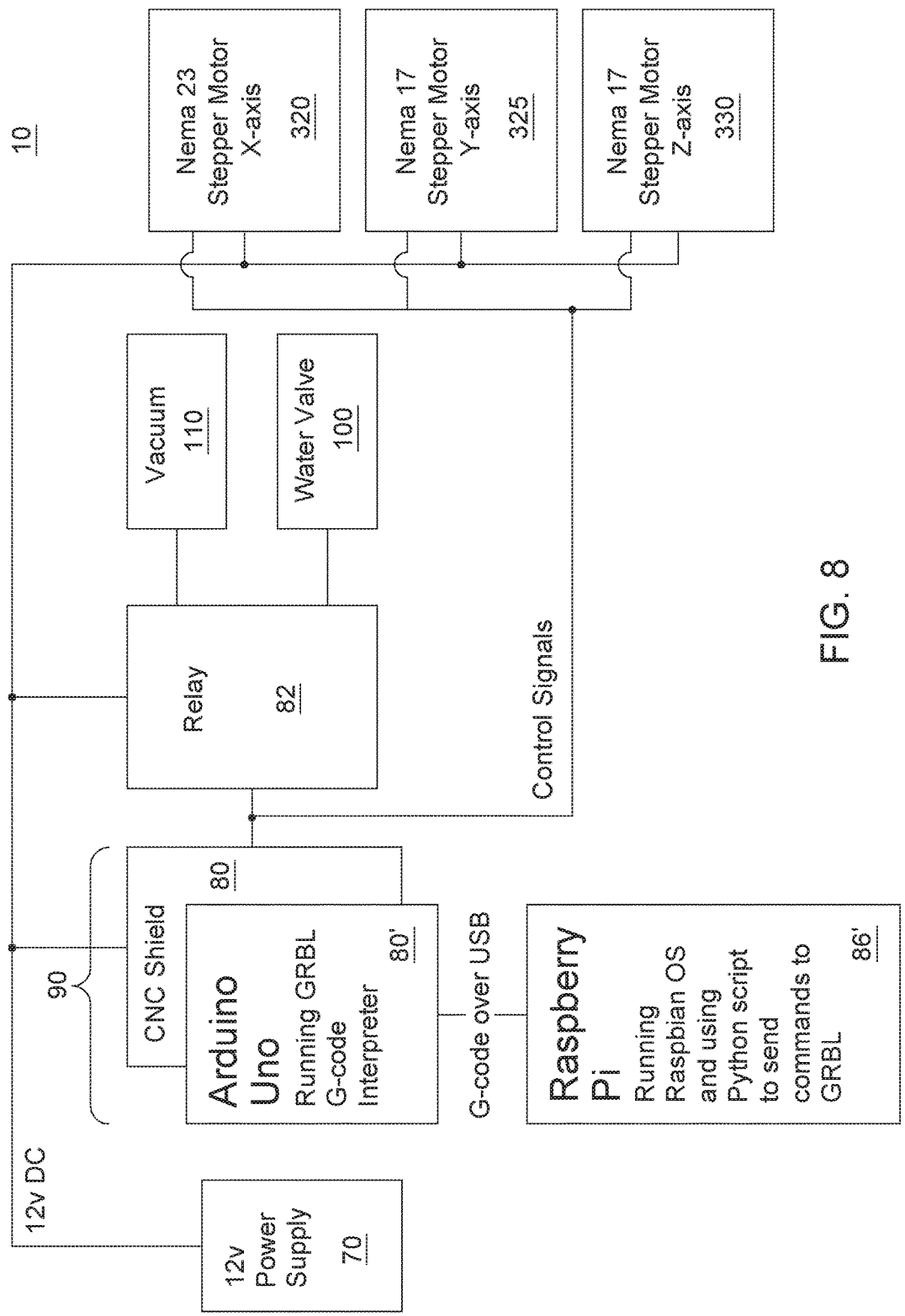
FIG. 8 is a block diagram of an automated farming system according to at least one example embodiment.

FIG. 8 is a block diagram of an automated farming system according at least one example embodiment.

The example embodiment shown in FIG. 8 illustrates one example embodiment of the powering and control of the automated farming system 10 (shown in FIGS. 1-6). The automated farming system 10 (shown in FIGS. 1-6) may include a power supply 70, which may supply power to a control system, computing device or controller 90. The control system 90 may include a computer control board 86', a code interpreter 80', and a stepper motor controller 80. The stepper motor controller 80 may be configured to send wirelessly (in a known manner) send control signals to an x-axis motor 320, a y-axis motor 325, and a rotation (z-axis) motor 330 (discussed previously in FIGS. 1-6 as motor 50, first motor, second motor, etc. which controlled movement of the at least one support 40 and/or at least one farming implement support) so that the at least one support 40 and farming implement support 60 may be moved to different locations to plant, water, and/or feed at desired locations, as previously described in FIGS. 1-6.

The stepper motor controller 80 may also communicate with a relay 82, which causes a vacuum 110 to turn on/off and/or a liquid valve 100 to open/close. The vacuum 110 may be associated with a planting head, and the liquid valve 100 may be associated with a watering, fertilizing, or other liquid dispensing system.

In other example embodiments, any proprietary or off the shelf controller may be configured to control the automated farming system 10.

Figure 9A:
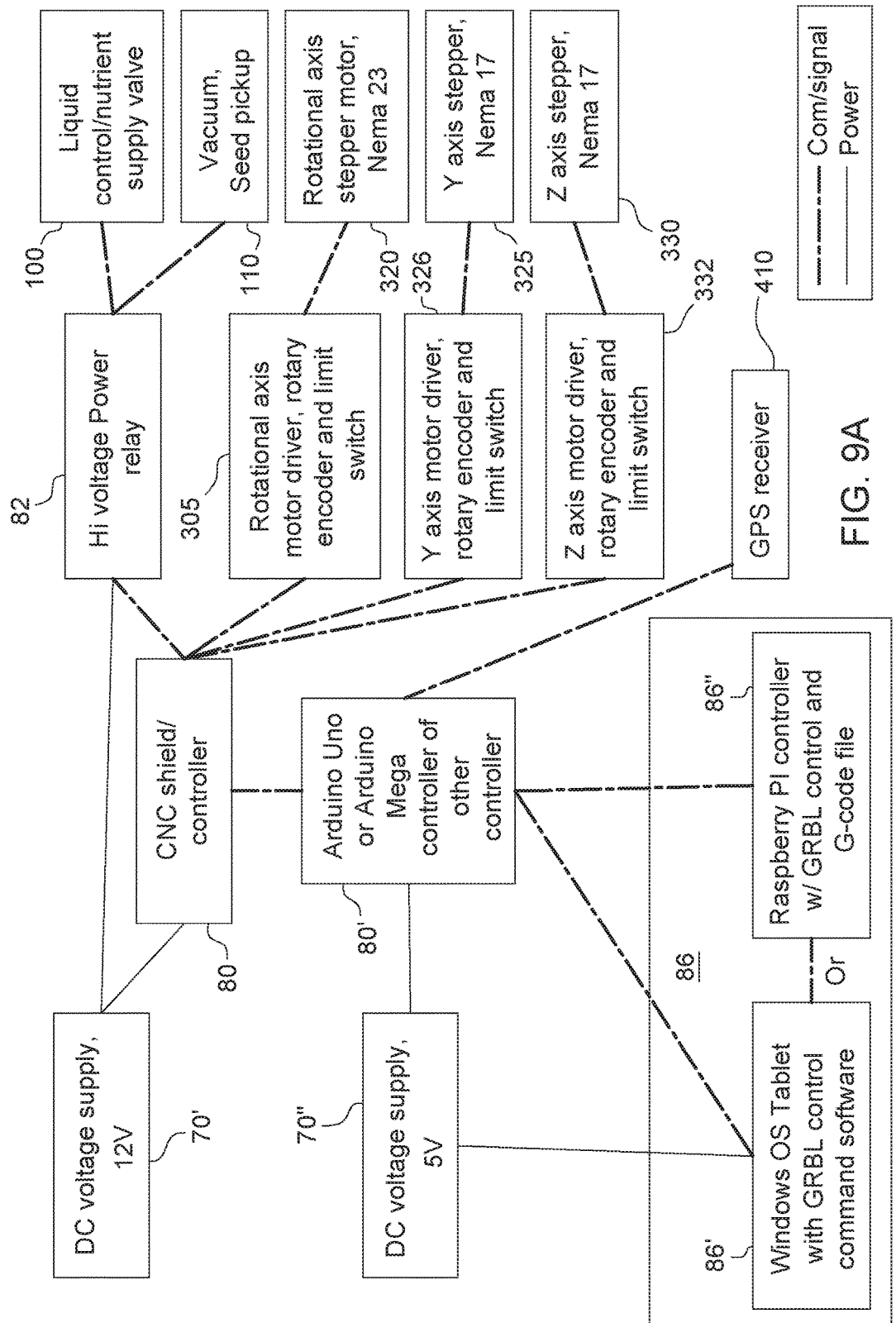
FIGS. 9A and 9B are block diagrams of automated farming systems according to at least one example embodiment.
Figure 9B:
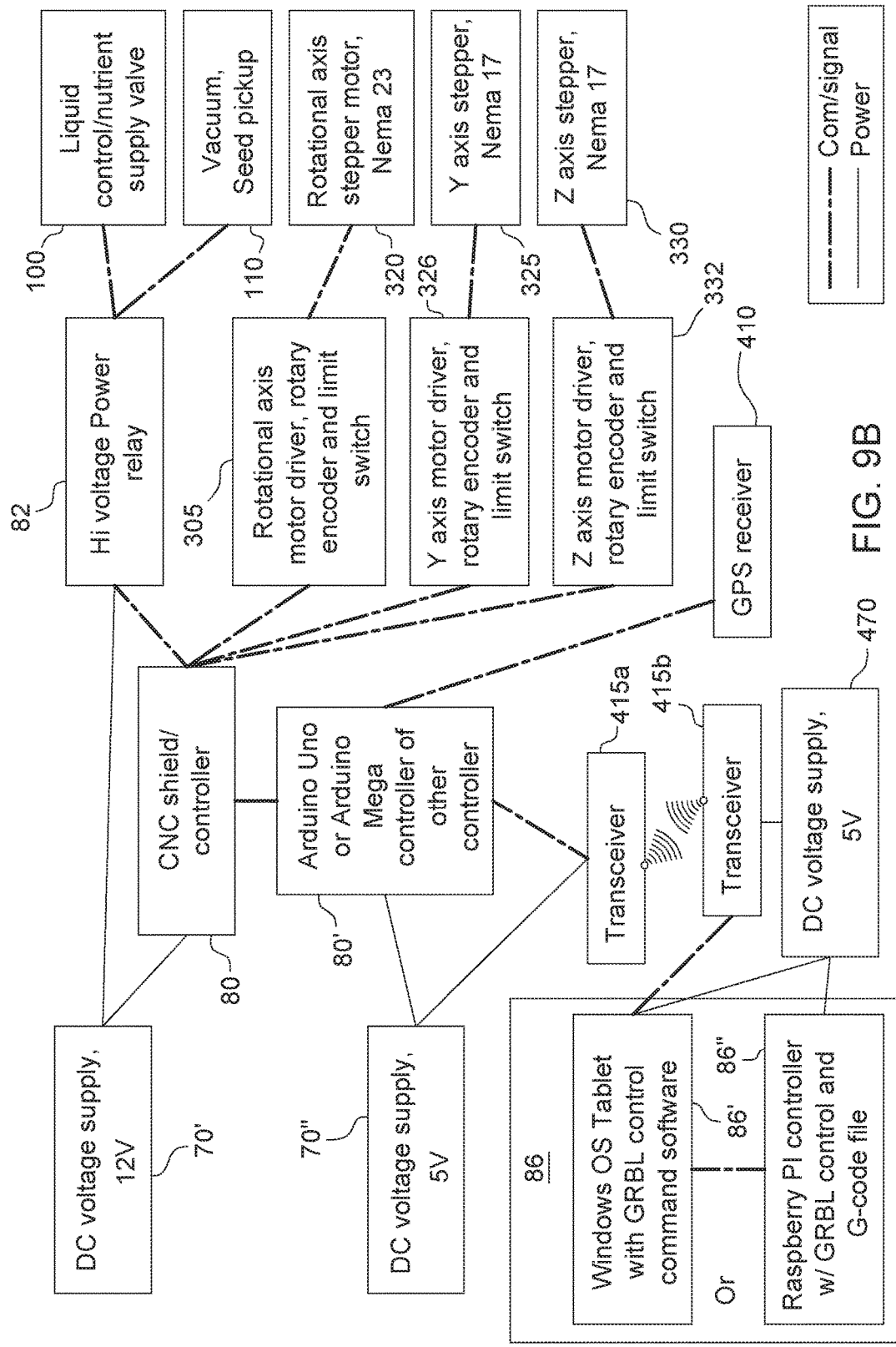

FIGS. 9A and 9B are block diagrams of an automated farming system according to at least one example embodiment.

In at least one example embodiment, as shown in FIG. 9A, the automated farming system of FIGS. 1-6 may include powering via the power supply 70, for example. As shown in FIG. 9A, the power supply 70 may include a 12 volt DC voltage supply 70' (high voltage power supply) and a 5 volt DC voltage supply 70" (low voltage power supply). The 5 volt DC voltage supply 70" may be configured to supply power to the computer control board 86, such as a tablet including a touchscreen user interface.

In an embodiment, the computer control board 86 may include GRBL control command software on a Windows tablet 86' or a Raspberry Pi controller with GBRL control and G-code file 86". The computer control board 86 may be configured to communicate with the code interpreter 80'. The computer control board 86 may include data storage medium configured to store instructions, such as planting, watering, and/or fertilizing instructions. The instructions may be remotely modified as needed depending on conditions sensed by sensors. Instructions may be communicated to the computer control board 86 by a remote computing device (not shown), such as a desktop computer, laptop computer, smartphone, tablet, or other smart device. In the alternative, instructions may be input directly into the computer control board 86 via the user interface 88 (shown in FIG. 7). The instructions may be remotely modified to control movement of the motors for spiral patterns movement, helical pattern movement, etc. for depositing at least one of seeds, water, or nutrients along a continuous path within a plot as the beam rotates about the fixed, central base and the farming implement support moves along the beam from a first position to a second position, the continuous path forming a spiral pattern extending from the fixed, central base.

The 12 volt DC voltage supply 70' (high voltage power supply) may supply power to the stepper motor controller 80, which also receives signals from the code interpreter 80'. The code interpreter 80' may also send and receive signals from a GPS receiver 410 associated with the support 40 so as to determine a location of the support 40 in relation to the fixed, central base 25.

The 12 volt DC voltage supply 70' may also supply power to a high voltage power relay 82. The stepper motor controller 80 may send and/or receives signals to and/or from the relay 82, which may send signals to open and close the liquid valve 100 and/or to turn on or off the seed pickup vacuum 110. The stepper motor controller 80 may also send signals to and/or from the x-, y-, and rotation (z-axis) motor drivers, rotary encoders, and/or limit switches 305, 326, 332, which in turn cause the x-, y-, and/or rotation (z-axis) motors 310, 325, 330 to turn on and/or off in order to cause the support 40 to rotate and/or the farming implement support 60 to move up or down, and/or along the beam 30.

In at least one example embodiment, as shown in FIG. 9B, the powering and control of the automated farming system 10 may be generally the same as in FIG. 9A, but may be configured for wireless, remote control of the system 10. As shown in FIG. 9B, the automated farming system 10 may include the first transceiver 415a associated with the frame 20. The computing device 86 may be a remote, wireless computing device including the second transceiver 415b and a computing device power supply 470. The second transceiver 415b may wirelessly send signals to the first transceiver 415a so as to wirelessly control the system 10 from the remote computing device 86.

The automated farming system 10 may be programmed to water the crops at particular time intervals on specified days. The automated farming system 10 may also be programmed to adjust an amount of water, fertilizers, herbicides, insecticides, fungicides, and the like per plant based on temperature and other weather conditions sensed and/or plant health by the sensors for each individual plant within the plot.

Portions of example embodiments and corresponding detailed description are presented in terms a processor specifically programmed to execute software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access.

Figure 10:
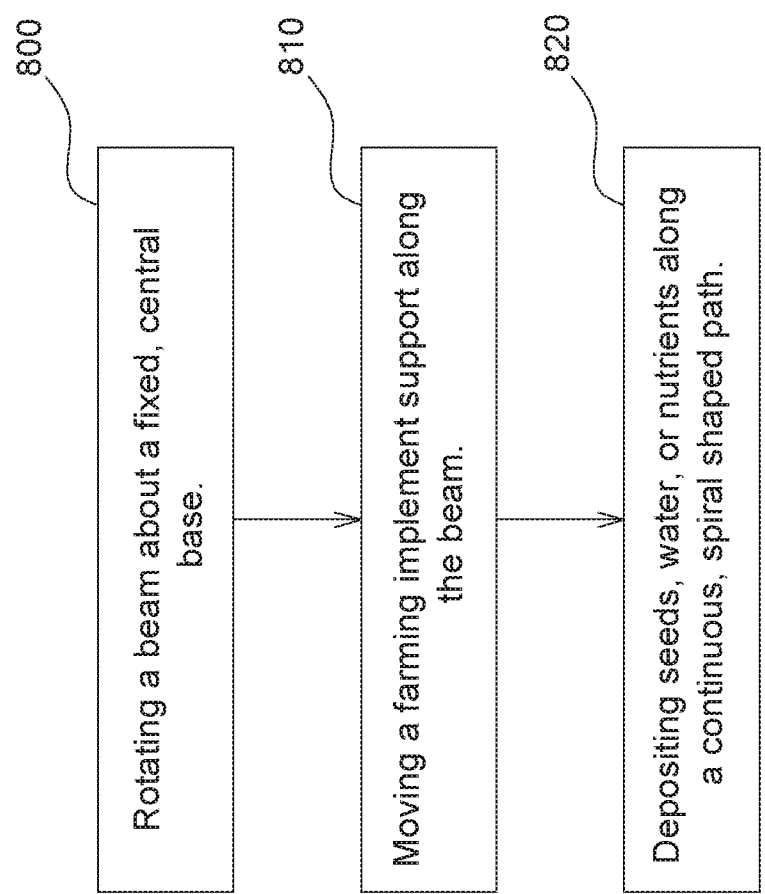
FIG. 10 is a flow chart illustrating a method of automated farming according to at least one example embodiment.

FIG. 10 is a flow chart illustrating a method of automated farming according to at least one example embodiment. The after-described methods may be implemented on the devices previously described in FIGS. 1-9. In at least one example embodiment, as shown in FIG. 10, an automated farming method may include 800 rotating a beam about a fixed, central base; 810 moving a farming implement support along the beam; and 820 depositing at least one of seeds, water, or nutrients along a continuous path within a plot as the beam rotates about the fixed, central base and the farming implement support moves along the beam from a first position to a second position. The beam may extend between the fixed, central base, and a movable support. The continuous path may form a generally spiral shaped pattern that extends from the fixed, central base.

For example, programming of the spiral pattern may include linear interpolation of points between each plant within a plot to achieve equidistant spacing of each plant along the spiral path and between adjacent spiral curves. The path along the spiral may represent a most efficient movement between each plant given movement distance along the spiral path.

In at least one example embodiment, the method may also include continuously monitoring a condition of the plot, and treating selected plants within the plot according to the condition thereof.

As set forth above, monitoring of the crop may include use of an NDVI sensor and NDVI images that may detect color change in a crop that indicates, for example, nutrient stress, excess water, and/or other detriments. The sensor may also sense and/or detect other aspects, for example, disease, weed detection, and/or non-crop vegetation within the plot. Any detection of detriments may be acted on by programming movements of the system 10 to the location of the detriment and/or actions of the system 10 to remedy the detriment. For example, the system 10 may be programmed to apply nutrients, spray weeds, apply a fungicide, physically pull or hoe weeds, and/or any other suitable action.

The method of FIG. 10 may be accomplished using the automated farming system of FIGS. 1-6.

Figure 11:
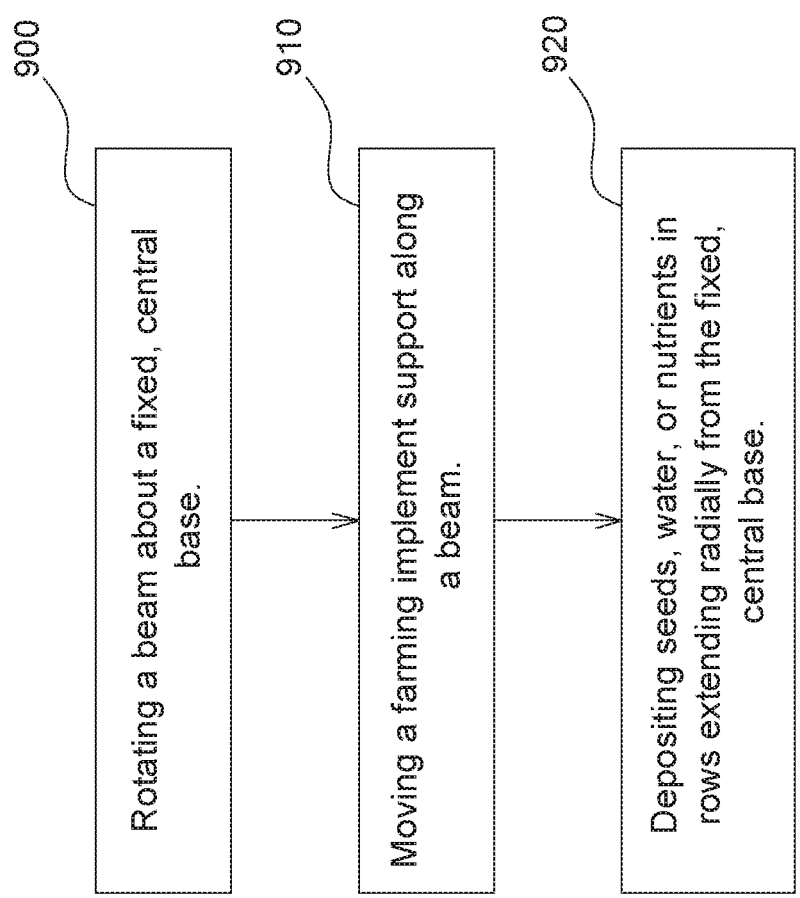
FIG. 11 is a flow chart illustrating a method of automated farming according to at least one example embodiment.

FIG. 11 is a flow chart illustrating a method of automated farming according to at least one example embodiment.

In at least one example embodiment, as shown in FIG. 11, an automated farming method includes 900 rotating a beam about a fixed, central base, the beam extending between the fixed, central base, and a support; 900 moving a farming implement support along the beam; and 920 depositing at least one of seeds, water, or nutrients in rows extending radially from the fixed, central base.

In at least one example embodiment, the method may also include continuously monitoring a condition of the rows. The method may further include treating selected plants within the rows according to the condition thereof.

The method of FIG. 11 may be accomplished using the automated farming system of FIGS. 1-6.

The aforementioned description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one embodiment of the invention relates to a non-transitory computer-readable storage medium comprising electronically readable control information stored thereon, configured in such that when the storage medium is used in a controller of a magnetic resonance device, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An automated farming system comprises:
   a frame including,
      a fixed, central base configured to pivot,
      a beam including a first end and a second end, the first end of the beam movably connected to the fixed, central base, and
      at least one movable support connected to the beam and configured to rotate the at least one movable support and the beam about the fixed, central base; and
   at least one farming implement support configured to move between the first end and the second end of the beam, movement of the at least one movable support and the at least one farming implement support being controllable such that the automated farming system is configured to farm crops in a substantially continuous row as the at least one farming implement moves from the first end to the second end of the beam, the substantially continuous row having a generally spiral shape extending from the fixed, central base to a location adjacent a path of the automated farming system.

2. The automated farming system of claim 1, wherein the at least one movable support includes a propulsion system.

3. The automated farming system of claim 2, wherein the propulsion system includes a plurality of tires and a first motor.

4. The automated farming system of claim 3, further comprising:
   an encoder associated with at least one of the plurality of tires.

5. The automated farming system of claim 3, further comprising:
   a second motor configured to move the at least one farming implement support between the first end and the second end of the beam.

6. The automated farming system of claim 5, further comprising:
   at least one power supply configured to supply power to at least one of the first motor or the second motor.

7. The automated farming system of claim 6, wherein at least one of the first motor or the second motor is in wireless communication with a remote computing device.

8. The automated farming system of claim 5, further comprising:

a remotely located computing device, configured to send operating instructions, to control movement of at least one of the at least one movable support or the at least one farming implement support, to at least one of the first motor or the second motor via a motor controller.

9. The automated farming system of claim 8, wherein the remotely located computing device includes a user interface.

10. The automated farming system of claim 8, wherein the remotely located computing device includes a data storage medium.

11. The automated farming system of claim 1, further comprising:
   at least one farming implement attachable to the at least one farming implement support, the at least one farming implement including at least one of a planting head, a liquid dispensing device, a weeding device, or a feeding system.

12. The automated farming system of claim 11, wherein the planting head comprises:
   a seed supply reservoir; and
   a vacuum configured to pick up seeds from the seed supply reservoir.

13. The automated farming system of claim 12, wherein the planting head further comprises:
   an air nozzle configured to eject seeds.

14. The automated farming system of claim 13, wherein the liquid dispensing device comprises at least one of:
   a liquid reservoir configured to contain at least one of water, a herbicide, or a plant nutrient; or
   a liquid supply line configured to supply at least one of the water, the herbicide, or the plant nutrient.

15. The automated farming system of claim 14, further comprising:
   at least one valve configured to selectively release at least one of the water, the herbicide, or the plant nutrient from the liquid reservoir or the liquid supply line.

16. The automated farming system of claim 1, further comprising at least one of:
   a visual marker dispensing system;
   a differential global positioned system (GPS) receiver located at the second end of the beam; or
   an angle sensor located at the fixed, central base, the angle sensor configured to measure an angle of rotation of the beam.

17. The automated farming system of claim 1, further comprising:
   at least one sensor configured to sense a condition of a plant, the at least one sensor connected to the at least one farming implement support.

* * * * *